(12) United States Patent
Okkonen

(10) Patent No.: US 7,668,612 B1
(45) Date of Patent: Feb. 23, 2010

(54) SYSTEM AND METHOD FOR EFFICIENT MANUFACTURE AND UPDATE OF ELECTRONIC DEVICES

(75) Inventor: Harri Okkonen, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 10/945,466

(22) Filed: Sep. 20, 2004

Related U.S. Application Data

(60) Provisional application No. 60/503,722, filed on Sep. 18, 2003.

(51) Int. Cl.
*G06F 19/00* (2006.01)

(52) U.S. Cl. .......................................... 700/95; 717/168

(58) Field of Classification Search ................. 700/159, 700/105, 95, 1; 717/168, 170, 171, 139; 711/5
See application file for complete search history.

(56) References Cited

U.S. PATENT DOCUMENTS

| | | | | |
|---|---|---|---|---|
| 5,261,055 A | 11/1993 | Moran et al. | ................ | 395/275 |
| 5,442,771 A | 8/1995 | Filepp et al. | ................ | 395/650 |
| 5,479,637 A | 12/1995 | Lisimaque et al. | .......... | 395/430 |
| 5,579,522 A | 11/1996 | Christeson et al. | .......... | 395/652 |
| 5,596,738 A | 1/1997 | Pope | .......................... | 395/430 |
| 5,598,534 A | 1/1997 | Haas | ...................... | 395/200.09 |
| 5,608,910 A | 3/1997 | Shimakura | ................... | 395/670 |
| 5,623,604 A | 4/1997 | Russell et al. | ............ | 395/200.1 |
| 5,666,293 A | 9/1997 | Metz et al. | ............... | 395/200.5 |
| 5,752,039 A | 5/1998 | Tanimura | .................... | 395/712 |
| 5,778,440 A | 7/1998 | Yiu et al. | ..................... | 711/154 |
| 5,790,974 A | 8/1998 | Tognazzini | ................. | 701/204 |
| 5,878,256 A | 3/1999 | Bealkowski et al. | ........ | 395/652 |
| 5,960,445 A | 9/1999 | Tamori et al. | ............... | 707/203 |
| 6,009,497 A | 12/1999 | Wells et al. | ................. | 711/103 |
| 6,038,636 A | 3/2000 | Brown, III et al. | .......... | 711/103 |
| 6,064,814 A | 5/2000 | Capriles et al. | ............ | 395/701 |
| 6,073,206 A | 6/2000 | Piwonka et al. | ............. | 711/102 |
| 6,073,214 A | 6/2000 | Fawcett | ...................... | 711/133 |
| 6,088,759 A | 7/2000 | Hasbun et al. | .............. | 711/103 |
| 6,105,063 A | 8/2000 | Hayes, Jr. | ................... | 709/223 |
| 6,112,024 A | 8/2000 | Almond et al. | ............. | 395/703 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Kidest Bahta

(57) ABSTRACT

Disclosed herein is a system and method for the efficient manufacture and update of electronic devices that is capable of pre-programming firmware/software into flash units (or other similar memory units) during their manufacturing so as to make the assembly line for the electronic devices more efficient and faster, and thus more productive. Various embodiments of the present invention may provide for an eventual update of the assembled electronic devices, after sales, employing embedded update agents in the electronic devices.

35 Claims, 3 Drawing Sheets

U.S. PATENT DOCUMENTS

| | | | |
|---|---|---|---|
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,865,387 B2 * | 3/2005 | Bucknell et al. | 455/418 |
| 6,915,325 B1 * | 7/2005 | Lee et al. | 709/202 |
| 6,978,453 B2 * | 12/2005 | Rao et al. | 717/171 |
| 6,996,818 B2 * | 2/2006 | Jacobi et al. | 717/170 |
| 7,065,347 B1 * | 6/2006 | Vikse et al. | 455/419 |
| 7,325,233 B2 * | 1/2008 | Kuck et al. | 718/103 |
| 2001/0029178 A1 * | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0077094 A1 * | 6/2002 | Leppanen | 455/420 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2004/0031029 A1 * | 2/2004 | Lee et al. | 717/171 |
| 2004/0098715 A1 * | 5/2004 | Aghera et al. | 717/173 |
| 2005/0039178 A1 * | 2/2005 | Marolia et al. | 717/168 |
| 2005/0246703 A1 * | 11/2005 | Ahonen | 717/172 |
| 2007/0067765 A1 * | 3/2007 | Motta et al. | 717/168 |
| 2007/0169073 A1 * | 7/2007 | O'Neill et al. | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

SYSTEM AND METHOD FOR EFFICIENT MANUFACTURE AND UPDATE OF ELECTRONIC DEVICES

RELATED APPLICATIONS

The present application makes reference to, claims priority to, and claims benefit of U.S. Provisional Patent Application Ser. No. 60/503,722, entitled "SYSTEM AND METHOD FOR EFFICIENT MANUFACTURE AND UPDATE OF ELECTRONIC DEVICES" filed on Sep. 18, 2003, the complete subject matter of which is hereby incorporated herein by reference, in its entirety.

The present application also hereby incorporates herein by reference the complete subject matter of PCT application having publication number WO/02/41147 A1, and having application number PCT/US01/44034, filed on Nov. 19, 2001, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both. Quite often by the time an electronic device is manufactured to the time that it is purchased by a customer, new bug fixes are released. Often, new versions of firmware or software are also released. The customer often does not get the latest versions of firmware or software for the device being purchased. Thus, newly acquired electronic devices often contain bugs and lack newer features released subsequent to its manufacturing.

Typically, electronic devices, such as mobile phones, personal digital assistants (PDA), etc. comprise of firmware of other software that is "flashed" into the device at some stage of its manufacturing, such as during the last stage of assembly of the device in an assembly line or during a phase of an outbound logistics operation (for example, during packaging or shipping). Flashing electronic devices takes several seconds, if not several minutes, based upon the size of the non-volatile memory in these devices. Thus, the flashing activity slows down the assembly line.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a method of manufacturing mobile handsets. Such a method may comprise procuring pre-programmed non-volatile memory chipsets comprising an update agent, a firmware, and a software. An embodiment of the present invention may also comprise assembling the mobile handsets employing the procured pre-programmed non-volatile memory chipsets, and shipping the assembled mobile handsets to at least one warehouse. The method may comprise updating the mobile handsets at a point of sale to end users.

Additional aspects of the present invention may be seen in a method of manufacturing an electronic device capable of updating at least one of firmware and software subsequent to manufacture. In an embodiment of the present invention the method may comprise procuring pre-programmed non-volatile memory comprising firmware capable of updating the at least one of firmware and software. The method may comprise assembling the electronic device employing the procured pre-programmed non-volatile memory, and shipping the assembled electronic device for distribution to an end user. The electronic device may comprise one of a mobile handset, a pager, a personal digital assistant, and a personal computer, and the electronic device may be portable. The pre-programmed non-volatile memory may comprise FLASH memory, and a contents of the pre-programmed non-volatile memory may be updated.

An embodiment of the present invention may comprise updating at least a portion of the pre-programmed non-volatile memory of the electronic device at a point of sale to a user, and may comprise updating configuration information of the electronic device at a point of sale to a user. An embodiment in accordance with the present invention may comprise updating at least a portion of the at least one of firmware and software of the electronic device at a point of sale to a user. Any updating of the pre-programmed non-volatile memory may occur at least one of before and after assembly of the electronic device.

An embodiment of the present invention may comprise adapting operation of the electronic device in order to avoid at least one of destruction, corruption, and loss of contents of the pre-programmed non-volatile memory during the assembly of the electronic device, and the pre-programmed non-volatile memory may be programmed at the point of manufacture of the pre-programmed non-volatile memory. In addition, an embodiment of the present invention may comprise verifying contents of the pre-programmed non-volatile memory in order to determine whether the contents have been corrupted.

Other aspects of the present invention may be observed in a system for the efficient manufacture of a plurality of electronic devices each having at least one associated identifier. Such a system may comprise a pre-programmer for programming one of a plurality of versions of at least one of firmware and software into each of a plurality of non-volatile memory units during manufacture of each non-volatile memory unit. Each of the plurality of versions of the at least one of firmware and software may be adapted for use with electronic devices having a predetermined value of the at least one associated identifier. An embodiment of the present invention may also comprise software for managing assembly of the plurality of electronic devices, the software capable of coordinating operations of a manufacturing process line in order to match pre-programmed non-volatile memory units to each of the plurality of electronic devices, using the at least one associated identifier. In addition, an embodiment of the present invention may comprise software for managing updating the contents of non-volatile memory units in the electronic devices, following distribution of the electronic devices to end users. An embodiment in accordance with the present invention may also comprise a provisioning unit capable of provisioning each of the plurality of electronic devices at least one of during and subsequent to the sale of the electronic device to a user. Another embodiment of the present invention may comprise a repository comprising the at least one of firmware and software for pre-programming into non-volatile memory units during manufacture of the non-volatile memory units. Various embodiments of the present invention may comprise a repository that provides at least one of updated firmware and updated software for updating contents of the pre-programmed non-volatile memory units after manufacture of the electronic devices. In various embodiments in accordance with the present invention, the electronic device may comprise one of a mobile handset, a pager, a personal digital assistant, and a personal computer, and the at least one associated identifier may comprise at least one of a make, a manufacturer, a model, and a serial number.

Aspects of the present invention may also be found in a method for efficiently manufacturing an electronic device employing at least one non-volatile memory unit the contents of which is capable of being updated. A method in accordance with an embodiment of the present invention may comprise procuring the at least one non-volatile memory unit in a pre-programmed condition, the at least one non-volatile memory unit comprising firmware capable of updating the at least one non-volatile memory unit. The method may also comprise assembling the electronic device using the at least one non-volatile memory unit, and shipping the assembled electronic device. In addition, the method may comprise updating contents of the at least one non-volatile memory unit after shipment. The pre-programming of the at least one non-volatile memory unit may occur during manufacture of the at least one non-volatile memory unit. The updating of the at least one non-volatile memory unit may comprise at least one of configuration, localization, and customization, and may employ the firmware capable of updating the at least one non-volatile memory unit. The updating may comprise conducting over-the-air update of at least one of configuration information, firmware, and software. The updating may use a set of executable instructions for converting a first version of contents firmware to a second version of firmware.

In an embodiment in accordance with the present invention, the assembling may comprise verifying contents of the at least one non-volatile memory unit to determine whether the contents have been corrupted during the assembling, and may comprise reprogramming the at least one non-volatile memory unit if it is determined, following the assembling, that the at least one non-volatile memory unit is corrupted. The at least one non-volatile memory unit may comprise FLASH memory, and the electronic device may comprise one of a mobile handset, a pager, a personal digital assistant, and a personal computer.

Further aspects of the present invention may be seen in an electronic device capable of updating at least one of firmware and software within the electronic device. An electronic device in accordance with an embodiment of the present invention may comprise at least one non-volatile memory having stored therein firmware for updating the at least one of firmware and software. The at least one of firmware and software may be at least capable of providing normal operation of the electronic device to a user, and the at least one of firmware and software may be disposed in the at least one non-volatile memory prior to assembly of the electronic device. The updating may use a set of executable instructions for converting a first version of the at least one of firmware and software to a second version of the at least one of firmware and software, and the updating may use information received via at least one of a cellular network, a paging network, a local area network, and the Internet. The at least one non-volatile memory may comprise flash memory, and the electronic device may comprise one of a cellular telephone, a pager, a personal digital assistant, and a personal computer.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the updating of firmware and/or software in electronic devices such as, for example, mobile (e.g., cellular) handsets, pagers, personal digital assistants, personal computers, and the like. More specifically, aspects of the present invention relate to systems and methods for installing updated functionality in a device such as those described above, during and after the manufacturing the device. Although the following discussion describes aspects of the present invention in terms of a mobile handset, the present invention is not limited in this regard. Various embodiments of the present invention may have applicability to a wide variety of electronic devices including, for example, mobile (e.g., cellular) handsets, pagers, personal digital assistants, personal computers, and the like. In addition, although the following discussion described exemplary embodiments of the present invention using FLASH memory, other forms of updatable non-volatile memory may also be used, without departing from the spirit and scope of the present invention.

Figure 1:
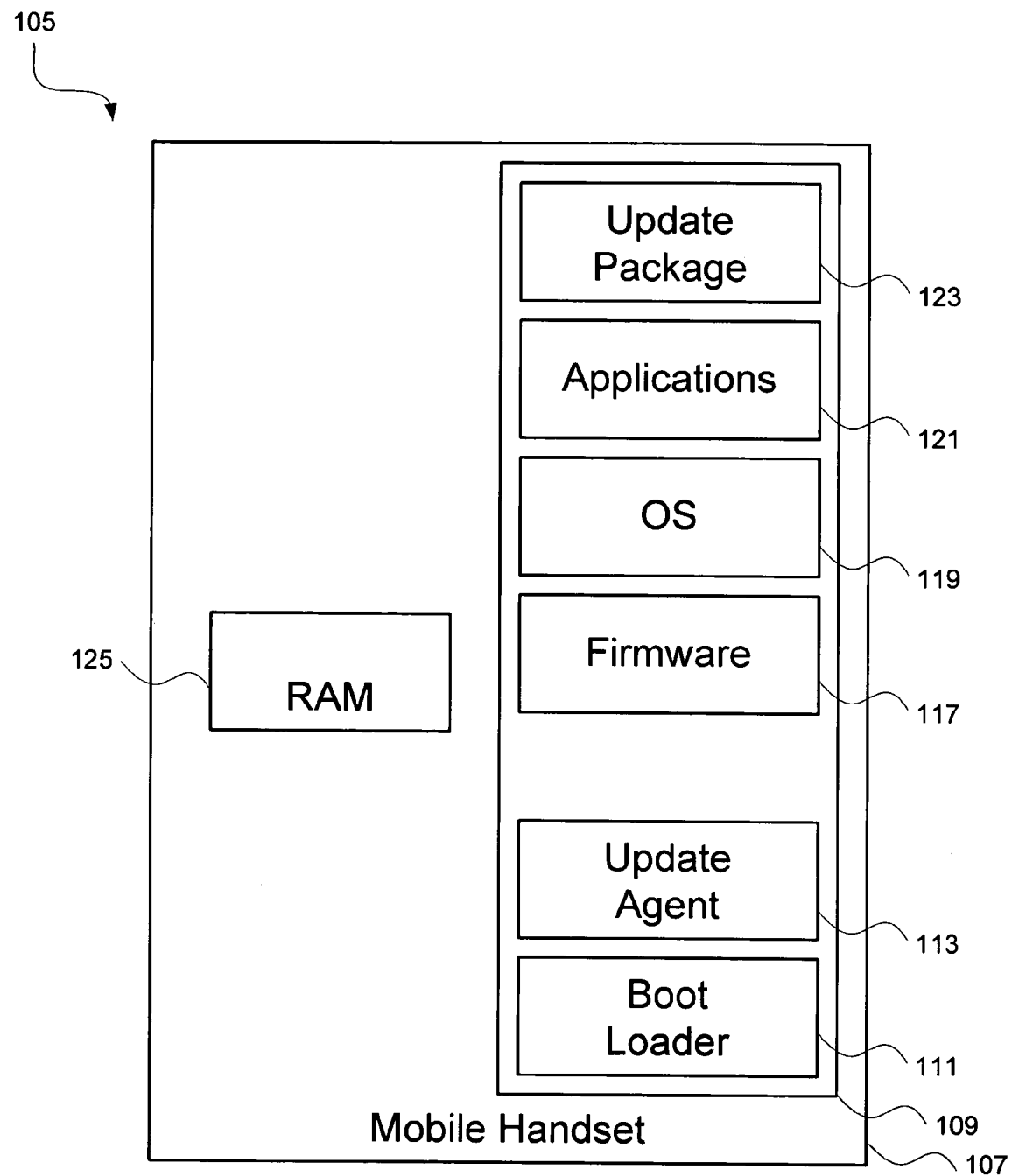
FIG. 1 is a perspective diagram of a mobile handset for use in a carrier network, and that may be capable of downloading update packages employing over-the-air (OTA) or other techniques and update its firmware and software, in accordance with an embodiment of the present invention.

FIG. 1 is a perspective diagram of a mobile handset 107 for use in a carrier network, and that may be capable of downloading update packages employing over-the-air (OTA) or other techniques and update its firmware and software, in accordance with an embodiment of the present invention. The mobile handset 107 shown in FIG. 1 comprises processing elements RAM 125 and non-volatile memory 109. The non-volatile memory 109 may be updatable, and may comprise an operating system (OS) 119, a firmware 117, an update agent 113, applications 121 and a loader 111. The applications 121 may comprise, for example a download agent for downloading update packages for updating the firmware and/or software of the mobile handset 107. The loader 111 may comprise, for example, a loader from Bitfone Corporation. The non-volatile memory 109 also comprises an update package 123 that has been downloaded from an external source such as, for example, a delivery server (not shown) in a carrier network. The update package 123 may comprise updating information such as, for example, a set of executable instructions for converting a first version of firmware and/or software in the mobile handset 107 to a second version of firmware and/or software. The update agent 113 may comprise firmware and/or software capable of updating the firmware 117, OS 119, applications 121, etc. using the updating information in the update package 123. The carrier network may comprise, for example, a cellular network, a paging network, a wired or wireless network, and the Internet.

In an embodiment of the present invention, the mobile handset 107 may comprise more than one update agents 113. The validity of the contents of the non-volatile memory 109 may be verified when necessary to determine whether the contents of the non-volatile memory 109 are corrupted or lost. When invoked, the appropriate update agent 113 may be capable of updating the firmware 117, the OS 119, applications 121, etc. using one or more update packages 123 retrievable by or available in the mobile handset 107.

Figure 2:
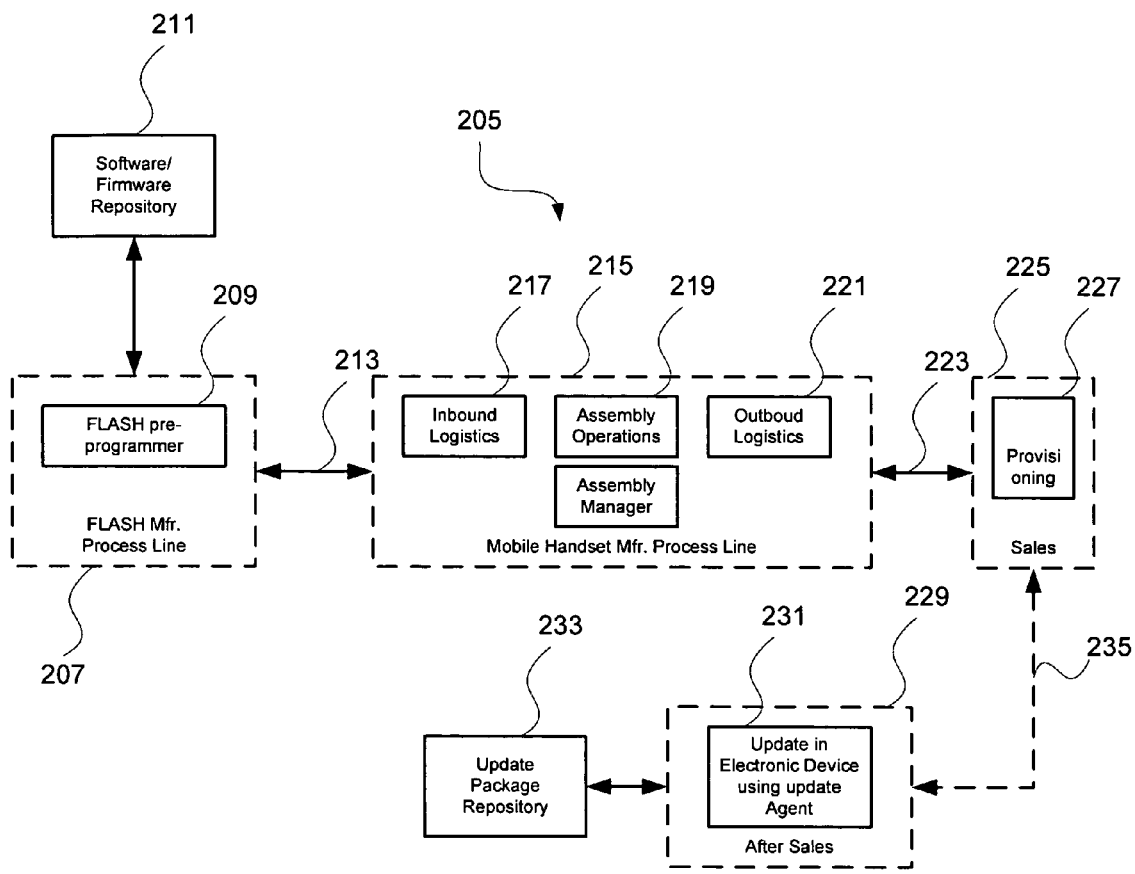
FIG. 2 is a perspective block diagram of an exemplary system supporting the efficient manufacture and updating of electronic devices such as, for example, the mobile handset of FIG. 1, in accordance with an embodiment of the present invention.

FIG. 2 is a perspective block diagram of an exemplary system 205 supporting the efficient manufacture and updating of electronic devices such as, for example, the mobile handset 107 of FIG. 1, in accordance with an embodiment of the present invention. The system 205 shown in FIG. 2 comprises a flash manufacturing process line 207 wherein flash memory (and non-volatile memory in general) may be pre-programmed employing software/firmware retrieved from a software/firmware repository 211. Each of the manufactured electronic devices may be identified by, for example, one or more of an associated make or manufacturer, a model identifier, and a serial number. The system 205 also comprises a manufacturing process line 215 such as, for example, a mobile handset manufacturing process line, wherein electronic devices are assembled. In addition, the system 205 may comprise a sales process line 225 wherein electronic devices such as, for example, mobile handsets are provisioned for distribution or sale to a user. The system 1205 may also comprise an after-sales process 229 in which updates of the non-volatile memory of the electronic device may be performed via a communication link. In an embodiment of the present invention, individual electronic devices such as, for example, mobile handsets 107 of FIG. 1, may update their firmware/software while in the after-sales process 229 by employing an update package retrieved from an update package repository 233, and an update agent resident in the electronic device. The communication link may comprise, for example, a wired or wireless network such as, for example, a cellular network, a wireless paging network, a local area network, and the Internet.

In an embodiment of the present invention, the system 205 may pre-program flash memory units (i.e., non-volatile memory units) during the manufacture of the non-volatile memory units in flash manufacturing process line 207. This may occur, for example, during the last phase of manufacturing of these flash memory units. The pre-programming of the non-volatile memory units makes the assembly line in the manufacturing process line 215 more efficient and faster, by eliminating programming of the non-volatile memory in the electronic devices during the manufacturing process. This pre-programming may be performed by a flash pre-programmer capability such as, for example, the flash pre-programmer 209 of FIG. 2. Any updates to the firmware/software pre-programmed into the non-volatile memory units of the electronic devices such as, for example, bug fixes or new feature releases, may be performed during the after sales process 229 supported by the system 205.

In an embodiment in accordance with the present invention, the inbound logistics component 217 of the mobile handset manufacturing process line 215 may comprise supply chain features such as, for example, logic for tracking specific pre-programmed contents in the non-volatile (e.g., flash) memory units being supplied and correlating them with make, model and version information used for the assembly of the electronic devices (e.g., mobile handsets, pagers, etc). The assembly operations component 219 may incorporate production planning and control logic, and scheduling logic, in addition to support for testing operations. The outbound logistics component 221 of the system 205 may comprise packaging, shipping, and tracking system components.

In an embodiment in accordance with the present invention, the system 205 may be capable of pre-programming firmware/software into flash memory units (or other similar non-volatile memory units) during their manufacture, so as to make the manufacturing process line 215 more efficient and faster, and thus more productive. The system 205 may also provide for an eventual update of the firmware and/or software of the assembled electronic devices, during the after sales process 229. This activity may employ embedded update agents such as, for example, the update agent 113 of FIG. 1, that are located within the electronic devices. The update agents 113 may use update packages such as, for example, the update package 123 of FIG. 1, that are retrieved from an update package repository 233.

In one embodiment of the present invention, an assembly manager (not shown) may manage the inbound logistics 217, assembly operations 219 and the outbound logistics 221 of a manufacturing process line 215, and may not incorporate any programming of the flash memory units that are assembled into the electronic devices.

In an embodiment of the present invention, an after-sales process 231 may be employed for updating firmware and/or software to install such things as, for example, bug fixes or new feature releases, that have been pre-programmed into the electronic devices.

Figure 3:
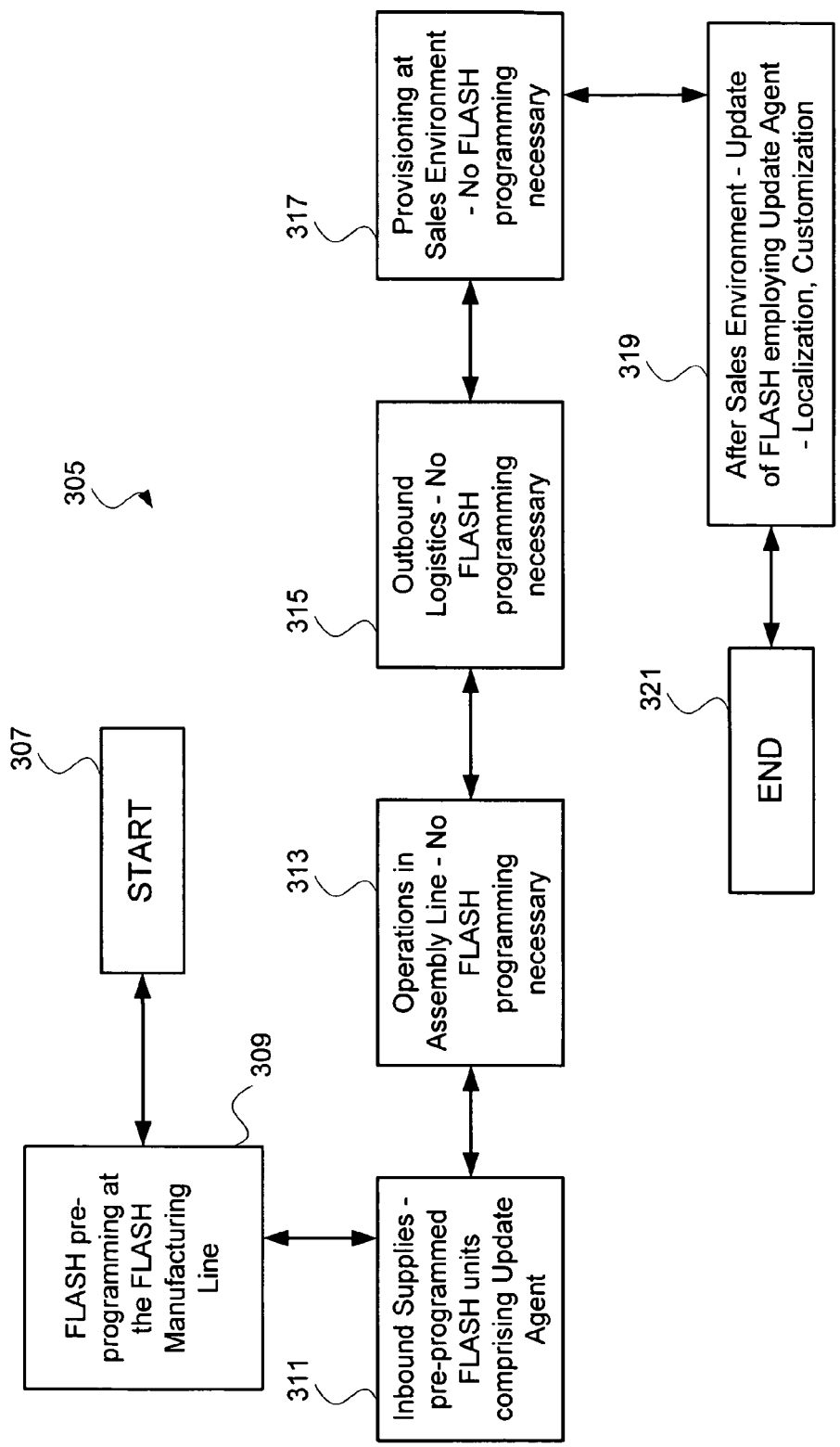
FIG. 3 is a flow chart showing a method of operating a system for efficient manufacture and update of electronic devices such as, for example, the system of FIG. 2, in accordance with an embodiment of the present invention.

FIG. 3 is a flow chart 305 showing a method of operating a system for efficient manufacture and update of electronic devices such as, for example, the system 205 of FIG. 2, in accordance with an embodiment of the present invention. The following discussion of the method of flow chart 305 makes reference to the elements in FIG. 2. At a start block 307, the processing begins when specific flash memory units designated for specific makes, models and versions of electronic devices such as, for example, mobile handsets, are identified. Then, at a next block 309, the manufacturing process for flash memory units such as, for example, the manufacturing process at a flash memory fabrication plant, pre-programs the individual flash memory units with specific firmware and software components based upon one or more of a mapping of customer orders; a bill-of-materials; make, model, and/or version information; batching information, etc. or any combination of such information. The pre-programmed flash memory units may also be tested for quality control purposes. The pre-programming activity results not only in the embedding of firmware/software in the flash memory units, but also results in the incorporation of appropriate update agents such as, for example, the update agent 113 of FIG. 1, into the flash memory units.

Then, at a next block 311, the inbound logistics for the manufacturing plant that assembles the electronic devices, such as mobile handsets, is executed. Such inbound logistics may comprise inbound supply chain logic for the pre-programmed flash memory units. The pre-programmed flash memory units may contain not only firmware/software components such as, for example, those shown in non-volatile memory 109 of FIG. 1, but also an update agent such as, for example, the update agent 113 of FIG. 1.

Then, at a next block 313, assembly line operations associated with the assembly of the electronic device such as, for example, a mobile handset, may be executed. A notable feature of such operations is that programming of the flash memory units may be avoided in an embodiment in accordance with the present invention. Such programming, often referred to as "flashing", may be conducted prior to assembly line operations such as occur, for example, during the fabrication of the flash memory units. Then, at a next block 315, outbound logistics operations may be conducted. In an embodiment of the present invention, these operations may avoid the "programming" or "flashing" of flash memory units incorporated during assembly of the electronic devices. The outbound logistics may also comprise packaging and shipping operations, and in addition, may include warehousing.

Then, at a next block 317, the provisioning operations may be conducted. In one embodiment of the present invention, this may occur in a sales environment. In another embodiment of the present invention, such provisioning operations may comprise over-the-air bootstrap provisioning of the electronic devices following purchase of the device by a customer. The use of bootstrap provisioning may be especially desirable for electronic device such as, for example, mobile handsets and personal digital assistants (PDAs). Further details of bootstrap provisioning of electronic devices such as those described above may be found in U.S. patent application Ser. No. 10/909,550, entitled "SECURE BOOTSTRAP PROVISIONING OF A MOBILE HANDSET IN CARRIER NETWORK", filed Aug. 2, 2004, the complete subject matter of which is hereby incorporated herein by reference, in its entirety. A notable feature of such sales operations is the lack of flashing of firmware and/or software components, as a subsequent update operation. In an embodiment of the present invention, an over-the-air (OTA) update operation conducted within the electronic device with the help of download and update agent firmware/software, may be expected to complete any firmware and/or software updates that might be involved.

Then, at a next block 319, in an after-sales environment wherein the customer has access to, for example, a carrier network or to alternative communications networks (e.g., an enterprise communication network), an electronic device such as, for example, a mobile handset or PDA, may update its firmware and/or software by accessing an update package repository (or an alternative or similar repository). The electronic device may then retrieve one or more update packages and apply them. Thus the firmware/software stored in flash memory units in the electronic devices may be updated to the latest version of firmware/software available. Again, bug fixes may also be incorporated. The update of flash memory units using an update agent such as, for example, the update agent 113 of FIG. 1 may be accompanied by localization and customization operations for the device.

Finally, the processing stops at an end block 321, when the customer starts normal operation of the purchased electronic device, such as a mobile handset or PDA.

In an embodiment of the present invention, an update agent such as, for example, the update agent 113 of FIG. 1 may be installed in a small field-programmable gate array (FPGA) chipset that is programmed during the manufacturing assembly phase 313 shown in FIG. 3. The firmware and software of the mobile handset may be pre-programmed into flash-based non-volatile memory units during a flash memory pre-programming activity 309 in a flash memory manufacturing line, and the pre-programmed flash memory unit may be incorporated during the assembly line operations 313. The small FPGA chipset may be programmed during the assembly process 313, or subsequently thereafter, so as to ensure that the update agent is correctly programmed regardless, and independent, of the firmware and software of the mobile handsets.

In one embodiment of the present invention, mobile handsets being assembled during the manufacturing process 313 may be subjected to memory validation after the assembly of the mobile handsets, to ensure that the pre-programmed contents in non-volatile memory chipsets are not lost or corrupted during the manufacturing assembly process. For example, a cyclic redundancy check (CRC) value computed on all or a subset of the non-volatile memory may determine whether the pre-programmed contents in non-volatile memory chipsets have been lost or corrupted. Mobile handsets that are determined to be defective due to corruption of the contents of pre-programmed non-volatile memory may be subsequently reprogrammed or updated in the manufacturing facilities operations 313, or in a warehouse subsequently, using an update agent such as, for example, the update agent 113 of FIG. 1. In a related embodiment of the present invention, the subsequent reprogramming or updating (e.g., using the update agent) may be conducted wirelessly, when the mobile handset with corrupted non-volatile memory is determined to have a working wireless communication capability.

In an embodiment of the present invention, the operations in the assembly line process 313 may comprise soldering pre-programmed non-volatile memory chipsets into the mobile handsets being assembled such that the pre-programmed contents in the non-volatile memory chipsets are not lost or corrupted. A verification step may be conducted to confirm that the pre-programmed memory chipsets are not corrupted following the soldering process used during manufacturing. For example, electronic device such as, for example, mobile handsets that are determined to contain corrupted pre-programmed non-volatile memory chipsets may be routed to a reprogramming process where the non-volatile memory chipsets may be reprogrammed with the correct contents.

In one embodiment of the present invention, the outbound logistics process may involve the tasks of shipping and warehousing of manufactured mobile handsets. The after-sales environment may be capable of conducting localization and customization of mobile handsets, the setting and/or changing of configuration parameters, etc., and may involve the use of an update agent pre-programmed into the electronic devices (e.g., mobile handsets). Localization may comprise adapting the mobile handset related to geographic concerns such as, time zone, language used for displays, and the like. Customization may comprise establishing service provider-specific information such as, for example, service provider name, radio frequency bands and/or channels in use, operating mode (e.g., analog, time division multiple access (TDMA), code division multiple access (CDMA), etc.), and the like. Configuration may include, for example, features available, subscriber specific information (e.g., account number and cellular telephone number), and the like.

The present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of manufacturing mobile handsets, the method comprising:
   procuring pre-programmed updatable non-volatile memory chipsets comprising an update agent, a firmware, and a software;
   saving information associating each of the pre-programmed updatable non-volatile memory chipsets with one or more identifiers of the mobile handsets;
   assembling each of the mobile handsets employing one of the pre-programmed updatable non-volatile memory chipsets, wherein the one pre-programmed updatable non-volatile memory chipset employed is determined using the saved information; and
   shipping the assembled mobile handsets to at least one warehouse.

2. The method according to claim 1 further comprising:
   updating the mobile handsets at a point of sale to end users.

3. A method of manufacturing an electronic device capable of updating one or both of firmware and software subsequent to manufacture, the method comprising:
   procuring one or more pre-programmed updatable non-volatile memory devices comprising firmware capable of updating the one or both of firmware and software;
   saving information associating each of the pre-programmed updatable non-volatile memory devices with one or more identifiers of the electronic device;
   assembling the electronic device employing one of the pre-programmed updatable non-volatile memory devices, wherein the one pre-programmed updatable non-volatile memory device employed is determined using the saved information; and
   shipping the assembled electronic device for distribution to an end user.

4. The method according to claim 3 wherein the electronic device comprises one of a mobile handset, a pager, a personal digital assistant, and a personal computer.

5. The method according to claim 3 wherein the electronic device is portable.

6. The method according to claim 3 wherein the pre-programmed updatable non-volatile memory devices comprise FLASH memory.

7. The method according to claim 3 further comprising:
   updating at least a portion of the pre-programmed updatable non-volatile memory of the electronic device at a point of sale to the end user.

8. The method according to claim 3 further comprising:
   updating configuration information of the electronic device at a point of sale to the end user.

9. The method according to claim 3 further comprising:
   updating at least a portion of one or both of firmware and software of the electronic device at a point of sale to the end user.

10. The method according to claim 3 wherein any updating of the pre-programmed updatable non-volatile memory occurs one or both of before and after assembly of the electronic device.

11. The method according to claim 3 further comprising:
    adapting operation of the electronic device in order to avoid one or more of destruction, corruption, and/or loss of contents of the pre-programmed updatable non-volatile memory during the assembly of the electronic device.

12. The method according to claim 3 wherein the pre-programmed updatable non-volatile memory is programmed at the point of manufacture of the pre-programmed updatable non-volatile memory.

13. The method according to claim 3 further comprising:
    verifying contents of the pre-programmed updatable non-volatile memory in order to determine whether the contents have been corrupted.

14. A system for the efficient manufacture of a plurality of electronic devices each having one or more associated identifiers, the system comprising:
    a computer system comprising a computer-readable medium having loaded thereon:
    a pre-programmer for programming one of a plurality of versions of one or both of firmware and software into each of a plurality of updatable non-volatile memory units during manufacture of each updatable non-volatile memory unit, each of the plurality of versions of the one or both of firmware and software adapted for use with electronic devices having a predetermined value of the one or more associated identifiers;
    software for managing assembly of the plurality of electronic devices, the software capable of coordinating operations of a manufacturing process line in order to match the pre-programmed updatable non-volatile memory units to each of the plurality of electronic devices, using the one or more associated identifiers; and
    software for managing updating the contents of the updatable non-volatile memory units in the electronic devices, following distribution of the electronic devices to end users.

15. The system according to claim 14 further comprising:
    a provisioning unit capable of provisioning each of the plurality of electronic devices one or both of during and subsequent to the sale of the electronic device to a user.

16. The system according to claim 14 further comprising:
    a repository comprising the one or both of firmware and software for pre-programming into updatable non-volatile memory units during manufacture of the updatable non-volatile memory units.

17. The system according to claim 14 further comprising:
    a repository that provides one or both of updated firmware and updated software for updating contents of the pre-programmed updatable non-volatile memory units after manufacture of the electronic devices.

18. The system according to claim 14 wherein the electronic device comprises one of a mobile handset, a pager, a personal digital assistant, and a personal computer.

19. The system according to claim 14 wherein the at least one associated identifier comprises one or more of a make, a model, and/or a serial number.

20. A method for efficiently manufacturing an electronic device employing one or more updatable non-volatile memory units, the method comprising:
procuring the one or more updatable non-volatile memory units in a pre-programmed condition, the one or more updatable non-volatile memory units comprising firmware capable of updating the one or more updatable non-volatile memory units;
saving information associating the one or more updatable non-volatile memory units to one or more identifiers of the electronic device;
assembling the electronic device using one of the one or more updatable non-volatile memory units, wherein the memory unit used is determined using the saved information;
shipping the assembled electronic device; and
updating contents of the one or more updatable non-volatile memory units after shipment.

21. The method according to claim 20 wherein the pre-programming of the one or more updatable non-volatile memory units occurs during manufacture of the one or more updatable non-volatile memory units.

22. The method according to claim 20 wherein the updating of the one or more non-volatile memory units comprises one or more of configuration, localization, and/or customization.

23. The method according to claim 20 wherein the updating of the one or more updatable non-volatile memory units employs the firmware capable of updating the one or more updatable non-volatile memory units.

24. The method according to claim 20 wherein the updating comprises:
conducting over-the-air update of one of configuration information, firmware, and/or software.

25. The method according to claim 20 wherein the updating uses a set of executable instructions for converting a first version of firmware to a second version of firmware.

26. The method according to claim 20 wherein the assembling comprises:
verifying contents of the one or more updatable non-volatile memory units to determine whether the contents have been corrupted during the assembling.

27. The method according to claim 26 wherein assembling comprises:
reprogramming the at least one non-volatile memory unit if it is determined, following the assembling, that the at least one non-volatile memory unit is corrupted.

28. The method according to claim 20 wherein the at least one non-volatile memory unit comprises FLASH memory.

29. The method according to claim 20 wherein the electronic device comprises one of a mobile handset, a pager, a personal digital assistant, and a personal computer.

30. An electronic device capable of updating one or both of firmware and software within the electronic device, the electronic device comprising:
at least one updatable non-volatile memory having stored therein firmware for updating the one or both of firmware and software;
the one or both of firmware and software at least capable of providing normal operation of the electronic device to a user; and
the one or both of firmware and software disposed in the at least one updatable non-volatile memory prior to assembly of the electronic device.

31. The electronic device according to claim 30 wherein the updating uses a set of executable instructions for converting a first version of the one or both of firmware and software to a second version of the at least one of firmware and software.

32. The electronic device according to claim 30 wherein the updating uses information received via one or more of a cellular network, a paging network, a local area network, and/or the Internet.

33. The electronic device according to claim 30 wherein the one or more non-volatile memory comprises flash memory.

34. The electronic device according to claim 30 comprising one of a mobile handset, a pager, a personal digital assistant, and a personal computer.

35. An electronic device manufactured according to a process comprising the steps of:
procuring one or more pre-programmed updatable non-volatile memory devices comprising firmware for updating one or both of firmware and software in the electronic device;
storing information associating each of the one or more pre-programmed updatable non-volatile memory devices with one or more identifiers of the electronic device;
assembling the electronic device employing at least one of the pre-programmed updatable non-volatile memory devices, wherein the at least one pre-programmed updatable non-volatile memory device employed is determined using the stored information associating each of the one or more pre-programmed updatable non-volatile memory devices with one or more identifiers of the electronic device;
shipping the assembled electronic device for distribution to an end user; and
wherein the electronic device supports updating of the one or both of firmware and software by the electronic device subsequent to manufacture of the electronic device.

* * * * *